(12) United States Patent
Park et al.

(10) Patent No.: US 6,261,500 B1
(45) Date of Patent: Jul. 17, 2001

(54) METHOD FOR MAKING A THERMOPLASTIC COMPOSITE TUBULAR MEMBER SUCH AS A GOLF SHAFT

(75) Inventors: David B. Park, Middleboro, MA (US); Laurent C. Bissonnette, Portsmouth, RI (US); Jerald A. Rolla, Santee, CA (US)

(73) Assignee: Phoenixx TPC, Inc., N. Dighton, MA (US)

( * ) Notice: Subject to any disclaimer, the term of this patent is extended or adjusted under 35 U.S.C. 154(b) by 0 days.

(21) Appl. No.: 09/202,699

(22) PCT Filed: Jun. 18, 1997

(86) PCT No.: PCT/US97/10442

§ 371 Date: Dec. 18, 1998

§ 102(e) Date: Dec. 18, 1998

(87) PCT Pub. No.: WO97/48457

PCT Pub. Date: Dec. 24, 1997

Related U.S. Application Data

(63) Continuation-in-part of application No. 08/665,610, filed on Jun. 18, 1996, now abandoned.

(51) Int. Cl.[7] ............................. B29C 33/42; B29C 70/20
(52) U.S. Cl. ..................... 264/258; 264/322; 264/324; 156/189
(58) Field of Search ................................. 264/257, 258, 264/313, 314, 322, 324; 156/187, 189

(56) References Cited

U.S. PATENT DOCUMENTS

| | | | |
|---|---|---|---|
| 5,413,338 | * 5/1995 | Kawamatsu | 273/80 B |
| 5,427,373 | * 6/1995 | Kusumoto | 273/80 R |
| 5,534,203 | * 7/1996 | Nelson et al. | 264/101 |
| 5,538,769 | * 7/1996 | Sandman, Jr. | 428/36.3 |
| 5,585,062 | * 12/1996 | Muramatsu et al. | 264/314 |
| 5,626,707 | * 5/1997 | Hadzicki et al. | 156/446 |

* cited by examiner

Primary Examiner—Jan H. Silbaugh
Assistant Examiner—Stefan Staicovici
(74) Attorney, Agent, or Firm—Lucas & Just

(57) ABSTRACT

A golf club shaft is made from sheets of carbon fibers in a thermoplastic matrix. A method and apparatus are also set forth for making a golf club shaft in a substantially voidless manner. An improvement in vibration dampening is obtained.

7 Claims, 7 Drawing Sheets

METHOD FOR MAKING A THERMOPLASTIC COMPOSITE TUBULAR MEMBER SUCH AS A GOLF SHAFT

This application is a 371 of PCT/US97/10442, which is a continuation-in-part of U.S. application Ser. No. 08/665,610, filed Jun. 18, 1996 now abandoned.

BACKGROUND OF THE INVENTION

1. Field of the Invention

This invention relates to composite golf club shafts and more specifically to golf club shafts constructed from high strength unidirectional fibers incorporated in a matrix of thermoplastic resin. The unidirectional high strength fibers may include fiberglass, carbon or other well known high strength reinforcing fibers impregnated with thermoplastic resin including nylon, polyphenylene sulfide (PPS) and other well known thermoplastic resins. This invention also relates to the method of forming golf club shafts with thermoplastic unidirectional prepregs and the apparatus used for making such golf club shafts.

2. Description of the Prior Art

Golf club shafts have conventionally been constructed as a tapered hollow metal member with the lower end connected to an upwardly projecting hosel extending upwardly from the golf club head. With the exception of putters, the shaft extends from an upper edge of the club head at a point near the heel of the club head. The upper end of the club shaft has a hand grip to enable a golfer to effectively grip, manipulate and control movement of the golf club head for optimum impact with a golf ball.

Golf club shafts of composite material utilizing high strength fibers in a matrix are well known. Usually, reinforced composite material prepregs made with uncured thermoset epoxy are wrapped onto an elongated mandrel having the desired shape of the interior of the finished shaft. Once wrapped, the thermosetting epoxy is cured to form the final shape of the shaft. U.S. Pat. No. 5,093,162 discloses various arrangements of the high strength fibers in a composite golf club shaft utilizing an epoxy matrix and arrangements of unidirectional high strength fibers to provide necessary physical characteristics of the golf club shaft. The laminations or plies of the fiber reinforced epoxy matrix prepreg are wrapped around the mandrel, after which a pressure tape is wrapped around the rolled up plies. The thermosetting epoxy resin is then cured, and the hollow shaft is removed from the mandrel. The shaft may be sanded or otherwise finished.

The current practice in forming a golf shaft from thermoset carbon fiber unidirectional prepregs includes the cutting of the unidirectional prepreg material into a plurality of individual pieces of specific configuration. The individual pieces are then rolled onto a metal mandrel, such as steel or the like, having the shape of the finished inside dimensions of the golf club shaft. Since thermoset prepreg carbon/epoxy material is sticky at or slightly above room temperature, about 70°–100° F. (about 20°–40° C.), the first layer will readily adhere to the mandrel, and the next layer to the preceding layer, etc. A rolling table is typically used to roll the thermoset prepreg pieces onto the mandrel.

Mandrels used to make golf club shafts usually have a straight linear taper in the central portion with cylindrical end portions of different diameters. The butt end has a larger diameter than the tip end, and the central portion typically has a gradual straight taper therebetween.

In making thermoset golf shafts, four or more separate pieces of prepreg usually extend the full length of the shaft. Normally, the unidirectional fibers are oriented in an opposed biased relationship. For example, as disclosed in the aforesaid U.S. Pat. No. 5,093,162, ply one may have fibers at a +45° orientation, ply two −45°, ply three 0° and ply four 0°, with 0° being the longitudinal axis of the mandrel.

The following U.S. patents disclose various developments in the formation of tubes or hollow shafts including golf club shafts using composite material with unidirectional high strength fibers and a thermosetting resin matrix in the form or a prepreg wrapped on a mandrel and cured with the formed tube or shaft then being removed from the mandrel for final finishing:

U.S. Pat. Nos. 4,097,626, 5,308,062, 5,421,573, 5,262,118, 5,326,099, 5,439,219

There have also been attempts to make carbon fiber golf club shafts with thermoplastic resins, see for example U.S. Pat. No. 5,262,118. In these other examples the thermoplastic resin is in discontinuous form which permits the carbon fiber sheet to remain sufficiently flexible so that it can be rolled onto a mandrel below its melt temperature. The disadvantage to these particular processes is that the finished shaft has many voids in it due to the discontinuities in the prepreg. These voids are deleterious, from both a strength and a performance point of view.

SUMMARY OF THE INVENTION

It has now been discovered that continuous thermoplastic matrices, and especially nylon 6 and polyphenylene sulfide, have desired properties for golf club shafts not available from thermoset matrices, notably better toughness and better vibration dampening. There has also been invented a method and apparatus which can produce a tightly wrapped shaft of thermoplastic unidirectional prepreg, which when cooled and compressed will result in a golf club shaft made of unidirectional high strength fibers, such as carbon-graphite fibers, interspersed in a voidless thermoplastic resin matrix. This is accomplished by forming the matrix as a uniform, voidless sheet, i.e. one that is substantially rigid. While this matrix prepreg cannot be rolled onto a mandrel because of its stiffness, it has been found that it can be simultaneously heated and rolled and, upon consolidation, will result in a substantially voidless shaft.

It is therefore an object of the present invention to provide a golf club shaft constructed of composite material made of unidirectional high strength fibers in a voidless thermoplastic resin matrix which has improved toughness and vibration dampening.

Another object of the present invention is to make golf club shafts of thermoplastic unidirectional prepregs that are rolled onto a metal mandrel in tightly wrapped patterns while the thermoplastic resin is heated and pliable to eliminate void formation, and solidifying each pattern of prepreg in its tightly wrapped condition on the mandrel by extracting heat from the prepreg during its rollup.

A further object of the present invention is to provide a golf club shaft made from thermoplastic unidirectional prepregs that are tightly wrapped on a metal mandrel without any void formation, and consolidated in a planned orientation of unidirectional fibers, with the mandrel subsequently removed and the golf club shaft finally finished.

A still further object of the invention is to provide a method of forming a golf club shaft from composite prepregs including unidirectional high strength fibers in a thermoplastic resin matrix including the step of firmly securing an edge of the first pattern of composite prepreg to the external surface of the mandrel by tape in order to prevent relative movement therebetween during the rollup of the first pattern onto the mandrel.

Yet another object of the invention is to provide a method of forming a golf club shaft in which an upper platen is mounted for vertical movement to exert pressure on the mandrel and patterns of composite material resting on the lower platen, and the lower platen is movable in a linear direction from front to rear sufficient to underlie a heater positioned behind the upper platen in order to elevate the temperature of the composite material on the platen and render it sufficiently flexible to wind tightly around the mandrel.

Still another object of the invention is to provide a method of forming a golf club shaft in which the top platen includes a resilient pad on its pressure surface in order to apply more uniform pressure on the thermoplastic pattern as it contacts the mandrel along the full length of the mandrel during application of downward force on the mandrel, in order to more tightly conform the pattern to the configuration of the mandrel.

Yet a further object of the invention is to provide a method of forming a golf club shaft in accordance with the preceding object in which heat is extracted from the thermoplastic resin while in contact with the resilient pad and top platen by cooling the top platen and causing the thermoplastic resin to harden sufficiently so that it stays tightly wrapped on the mandrel.

A still further object of the invention is to provide a method of making a golf club shaft in accordance with the preceding objects in which the rolled up thermoplastic patterns on the mandrel are spirally wrapped with a tensioned tape that will not melt at the melting temperature of the thermoplastic resin so that the tension in the wrapping tape applies constant inward pressure on the thermoplastic patterns during subsequent heating and cooling to cause effective consolidation of the thermoplastic composite material on the mandrel into a consolidated single continuous thermoplastic matrix with fibers uniformly dispersed in a planned orientation with virtually no void spaces or "unwet" fibers.

Still another important object of the invention is to provide an apparatus for making a golf club shaft of a thermoplastic composite matrix having high strength fibers including a lower platen which is capable of moving a mandrel and individual pieces of composite material supported thereon sequentially from a position underneath a heater to a position underlying a top platen which moves vertically downwardly to exert pressure on the mandrel and plies of composite material as they are rolled onto the mandrel, and continues under controlled powered movement to effectuate tight rolling of the pieces of composite material onto the mandrel while in contact with the upper platen.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
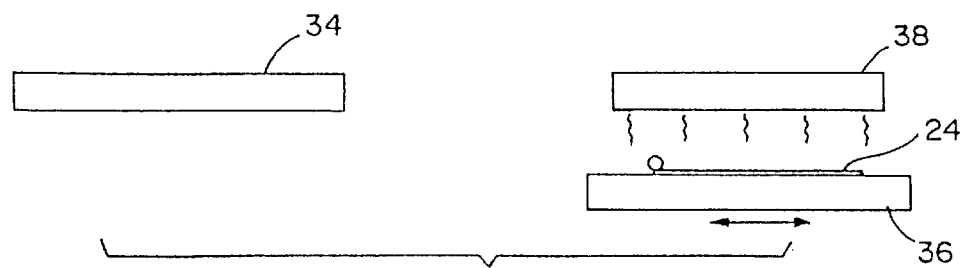
FIG. 1 is a side elevational view schematically illustrating the relationship of the upper platen, lower platen and heater with the mandrel and first pattern of thermoplastic composite prepreg resting on the lower platen underneath the heater in accordance with the present invention.

In describing the preferred embodiments of the present invention, such as illustrated in the drawings, specific terminology will be used for the sake of clarity. However, the invention is not intended to be limited to the specific embodiment illustrated and terms so selected. Each specific term includes all equivalents which operate in a similar manner to accomplish a similar purpose.

Figure 16:
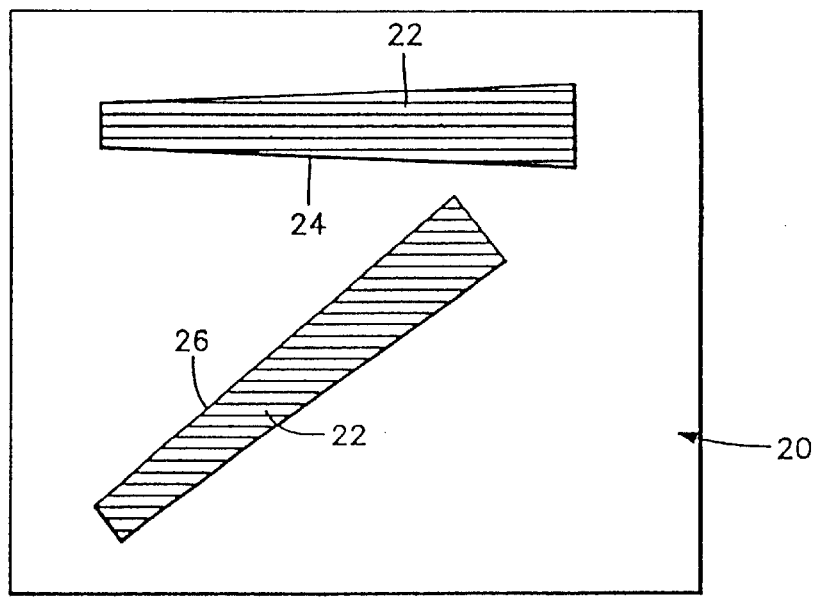
FIG. 16 is a plan view schematically illustrating a sheet of composite material with patterns cut out therefrom, in which the high strength fibers are 0° or 45° relative to the length of the patterns cut from the large sheet, in accordance with the present invention.

Referring initially to FIG. 16, a large sheet of composite material is designated by reference numeral 20 which includes unidirectional high strength fibers 22 of carbon, fiberglass, aramid or other high strength material in a matrix of thermoplastic material such as polyamides (nylon 6, nylon 6,6, nylon 11), polyphenylene sulfide, polyether imide, polybutylene terephthalates, polyoxymethylenes, polycarbonates, modified polyphenylene oxides and other well known thermoplastic resins. While a single thermoplastic resin is preferred, mixtures may be used. Sheets 20 are typically formed from high strength unidirectional tape strips laid side-by-side and adhered along their side edges by gluing or the like. The fibers 22 thus all lie in the same direction, i.e. 0° orientation. Individual pieces or patterns 24 and 26 of thermoplastic unidirectional prepregs can then be cut from the sheet 20 in any desired size and direction of fibers. As shown, the patterns 24 have the unidirectional fibers 22 extending lengthwise of the pattern at a 0° angle or orientation. The pattern 26 is cut on the bias with the unidirectional fibers 22 at a 45° angle. Other individual pieces or patterns can be cut from the sheet 20 with the bias of the unidirectional fibers at different positive and negative orientations as desired for the final product.

Figure 17:
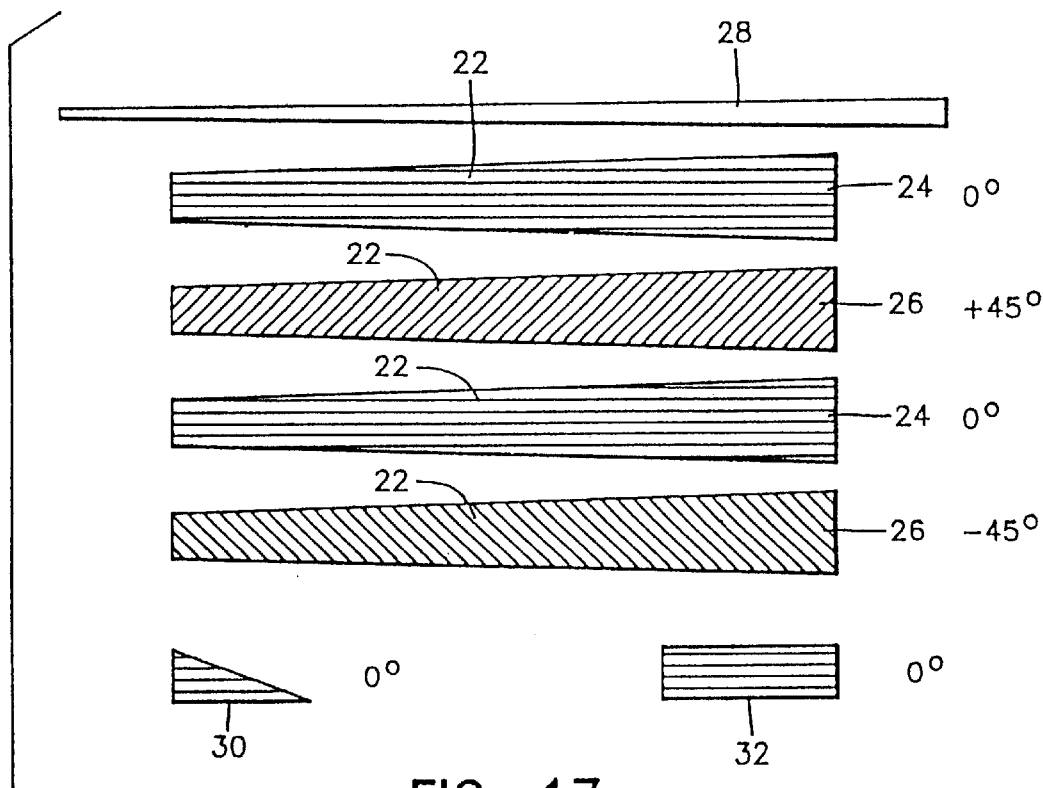
FIG. 17 is a group plan view schematically illustrating a typical layup on a tapered mandrel in accordance with the present invention.

In forming a typical layup for a golf club shaft, attention is directed to FIG. 17 in which a mandrel 28 is provided with a first pattern 24 which includes unidirectional fibers 22 at a 0° angle. The second pattern 26 suitably has unidirectional fibers 22 at a +45° angle. The third pattern 24 suitably has unidirectional fibers 22 at a 0° angle and a fourth pattern 26 has unidirectional fibers 22 at a −45° angle. These four patterns extend the full length of the golf club shaft which may be on the order of about 45 inches (about 115 cm) which is less than the length of the mandrel 28 which is usually about 54 inches (about 137 cm) long. Additional patterns 30 and 32 having the unidirectional fibers at 0° orientation, as shown, may be incorporated into the typical layup in order to provide additional thickness, or diameter, at the tip or club head end and at the butt or grip end.

As known in the art, the patterns 24 with the unidirectional fibers 22 at a 0° angle make the golf club shaft stronger and stiffer in the longitudinal direction to resist bending. Patterns 26, with the fibers 22 at a bias to the longitudinal axis, provide torsional strength and stiffness to the full length of the shaft. Patterns 30 and 32 strengthen the ends of the golf club shaft against bending. Thus, in assembly, the patterns 24, which alternate with patterns 26, and the patterns 30 and 32 provide strength and stiffness against bending throughout the full length, and the entire golf shaft is strengthened throughout its length against bending and torsion with additional strengthening against bending at the tip end and butt end. By varying the size, shape and number of the patterns, the size and shape of the mandrel, the strength and modulus of the fibers, the orientation of the fibers in each pattern, and the percent of the fiber to percent of thermoplastic resin, the golf shaft can be constructed to meet virtually any configuration with desired strength characteristics over a broad weight range. Further, the thermoplastic composite material provides a high degree of toughness and vibration dampening desirable in a golf club shaft.

Figure 2:
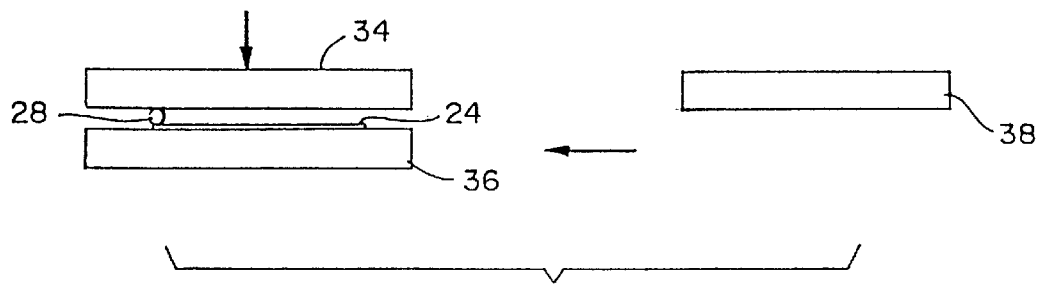
FIG. 2 is a side elevational view schematically illustrating movement of the lower platen into underlying relation to the upper platen and downward movement of the upper platen to apply pressure to the mandrel and plies of composite prepreg during the rollup process in accordance with the present invention.

Referring now to FIG. 1, the apparatus to form the golf club shaft of the present invention includes an upper platen generally designated by the numeral 34, a lower platen generally designated by the numeral 36 and a heater 38. Heater 38 is preferably a long flat radiant heater having sufficient dimensions to heat the mandrel 28 and large pattern 24 to be rolled thereon. The lower platen 36 can move in a linear direction from a position underlying and in alignment with the heater 38, as illustrated in FIG. 1, to a position in underlying relation to the upper platen 34, as illustrated in FIG. 2. Initially, the mandrel 28 and a first pattern 24 taped thereto are placed on the lower platen 36, and the lower platen is then moved into alignment with the radiant heater 38.

Figure 3:
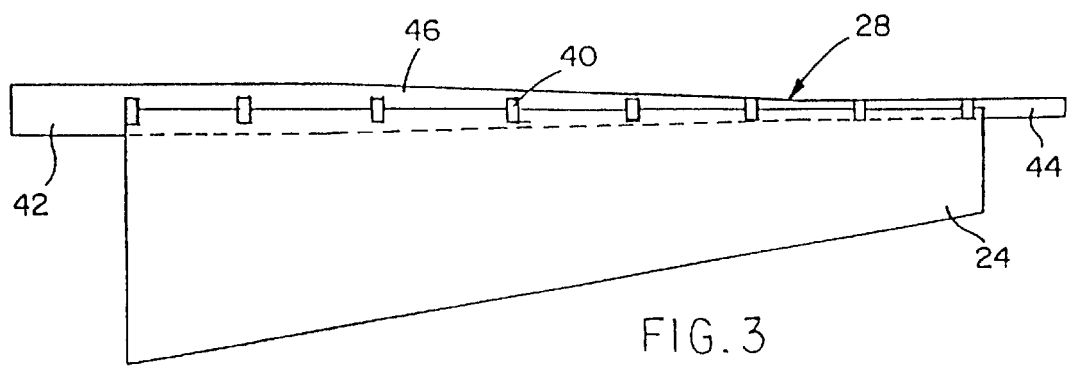
FIG. 3 is a bottom plan view schematically illustrating the mandrel and first pattern of composite material taped to the mandrel in accordance with the present invention so that it can be placed on the lower platen for rollup.

FIG. 3 illustrates the attachment of the first pattern 24 to the surface of the mandrel 28 prior to rollup. The mandrel 28 is normally made of stainless steel and the thermoplastic prepregs are hard, generally smooth, non-sticky sheets at or near room temperature. Therefore, it has been found necessary to employ some mechanism to attach the leading edge of the first pattern to the mandrel. Preferably, a plurality of strips of tape 40 are used for this purpose. Alternatively, the tape may be used full length between the edge of the first pattern 24 and the mandrel 28. This tape provides a means of attachment of the unsoftened/unmelted thermoplastic prepreg pattern 24 to the mandrel so that the parts remain stuck together in proper position during heating and after heating so that the pattern 24 will roll up in proper position on the mandrel. Preferably, tape 40 is made of the same thermoplastic resin as the prepregs so that the tape becomes part of the composite structure during curing; however, other materials, notably polyester, can also be used as the tape.

Figure 4:
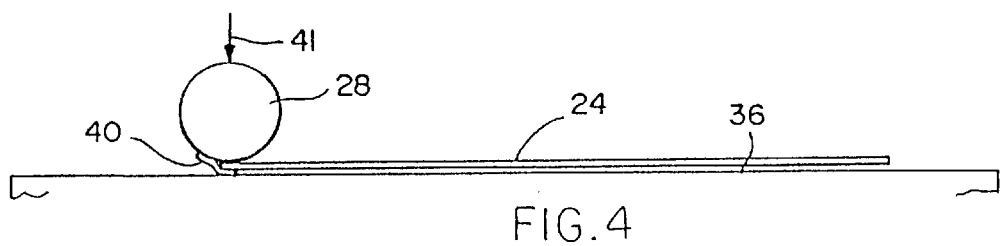
FIG. 4 is a side elevational view schematically illustrating the positioning of the mandrel, tape and first pattern of composite material on the lower platen prior to rollup in accordance with the present invention.
Figure 5:
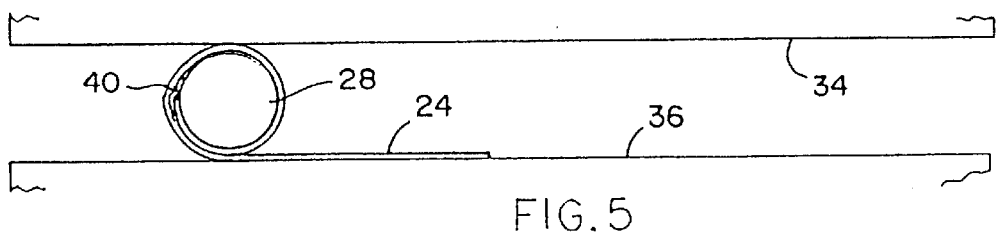
FIG. 5 is a side elevational view schematically illustrating the relation of the lower and upper platens, the mandrel and the first convolutions of the first pattern of composite material rolled onto the mandrel in accordance with the present invention.

After the pattern 24 is taped to the mandrel 28, and the mandrel 28 and pattern 24 are placed on the lower platen 36, the lower platen 36 is oriented under the heater 38 and heated to above the melt temperature of the resin. Once the thermoplastic resin has been heated to above its melting point and the prepreg has sufficiently softened, the lower platen is then moved to a position below the upper platen and the upper platen 34 descends and comes into contact with the mandrel as illustrated in FIG. 2. FIG. 4 illustrates the association of the mandrel 28, the first pattern 24 and the adhesive tape 40 when placed on the lower platen 36 and beginning the rollup with the arrow 41 indicating the pressure from the upper platen 34. The first pattern 24 is then rolled onto the mandrel by the controlled movement of the lower platen 36, thus tightly rolling the first pattern 24 onto the mandrel as illustrated in FIG. 5.

It has been found that thermoplastic resin at slightly above its melt temperature is not sufficiently sticky for the rolled up first pattern 24 to remain tightly rolled on the mandrel 28. It has been discovered that a tight rollup of the thermoplastic prepreg can be obtained if the upper platen is capable of conforming to the shape of the mandrel, in a manner similar to the lower platen, and heat is removed from the thermoplastic resin after the prepreg has been rolled sufficiently to establish the necessary tight wrap on the mandrel. The removal of the heat from the rolled thermoplastic prepreg is preferably achieved in accordance with the present invention by cooling the upper platen 34. Hence, as the thermoplastic prepreg is rolled and contacts the upper platen, the prepreg is pressured to conform fully to the irregular shape of the mandrel while at the same time the thermoplastic resin is cooled below its solidification temperature. Thus, the hardened thermoplastic composite material retains its rolled contour. Once the mandrel has made a complete revolution relative to the first pattern 24, the cooled and hardened thermoplastic composite will retain its tightly wrapped condition on the mandrel.

Figure 6:
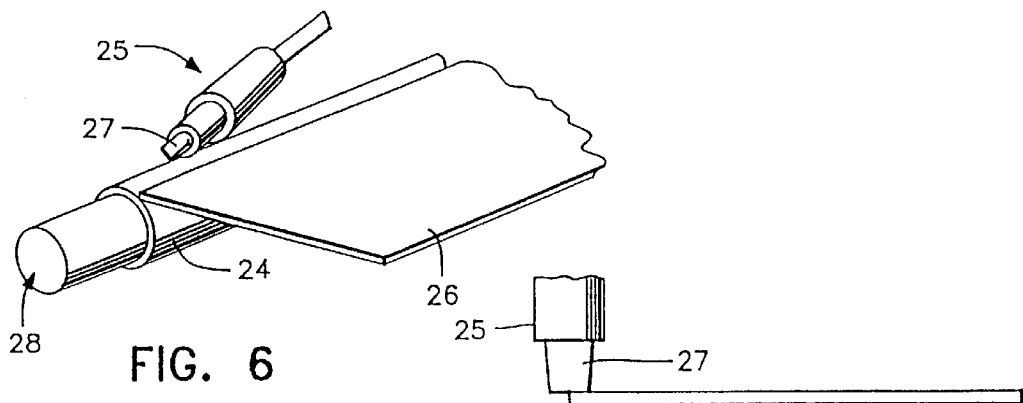
FIG. 6 is a side perspective view schematically illustrating the welding of a second or successive pattern of composite prepreg to a first or previous pattern already tightly wrapped on the mandrel in accordance with the present invention.
Figure 7:
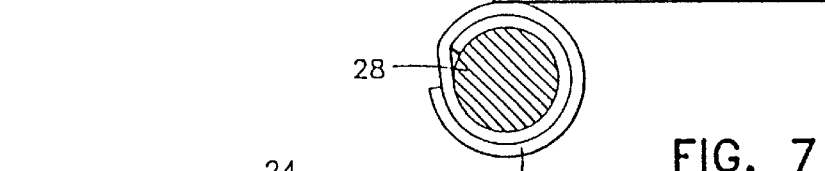
FIG. 7 is a side view, partially in cross-section, schematically illustrating the welding operation shown in FIG. 6.
Figure 8:
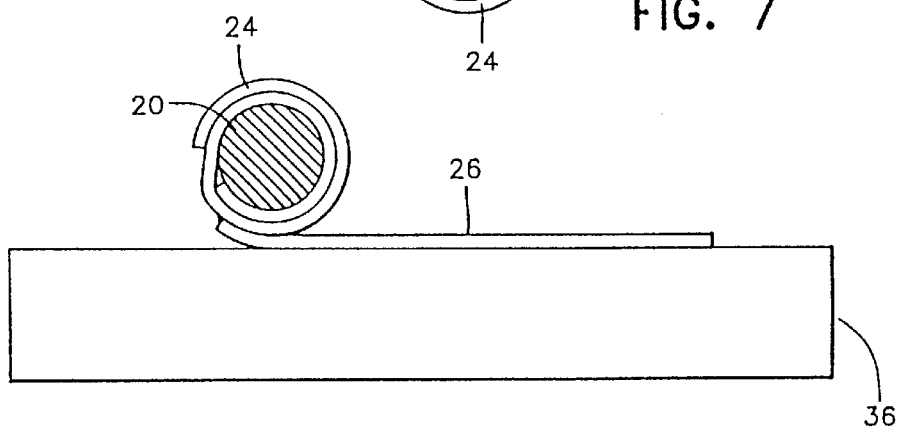
FIG. 8 is a side view, partially in cross-section, illustrating the position of the second pattern welded to the first pattern tightly wrapped on the mandrel ready for heating and subsequent rollup.

FIGS. 6–8 of the drawings illustrate how the second and all successive patterns of composite prepregs are attached to the preceding rolled up pattern on the mandrel. Since the composite material in accordance with the present invention comprises a thermoplastic resin, it is easy to apply local heat and pressure to locally fuse any subsequent pattern to a previously rolled up pattern. This may be done, for example, by a simple electric soldering iron, designated in the drawings by the numeral 25. The hot tip 27 of the soldering iron together with slight pressure is quite sufficient to fuse the edge of the second, or subsequent, pattern to the preceding pattern which is wrapped on the mandrel covering more than its 360° surface. Thus, by drawing the tip 27 of the soldering iron 25 along the edge of the second or subsequent pattern 26, which is aligned with the axis of the mandrel 28 and previous pattern 24, the entire leading edge of the second pattern 26 can be fused and attached to the first pattern 24 on the mandrel 28, as illustrated in FIGS. 6 and 7. The mandrel, with the first pattern 24 wrapped thereabout and the second pattern 26 fused and attached along its leading edge to the first pattern, is then placed on the lower platen 36 for subsequent heating and rolling, as illustrated in FIG. 8. Since the subsequent patterns are fused to the preceding rolled up pattern, the tape 40 is only necessary to secure the first pattern to the mandrel 28 as illustrated in FIGS. 3–5.

Once the second, or subsequent, pattern such as pattern 26 has been fused along its leading edge to the preceding pattern rolled on the mandrel, and the assembly positioned on the lower platen as shown in FIG. 8, the subsequent pattern is ready for rollup and the steps of heating and rollup, as illustrated in FIGS. 1 and 2, are repeated. The preceding pattern or patterns already rolled on the mandrel do not soften significantly because the metal mandrel acts as a heat sink. Once the subsequent pattern is sufficiently softened by heating to above its melt temperature, the lower platen is moved beneath the upper platen 34 and the rollup is performed tightly and subsequently the heat is removed in the manner previously described.

Figures 9, 15:
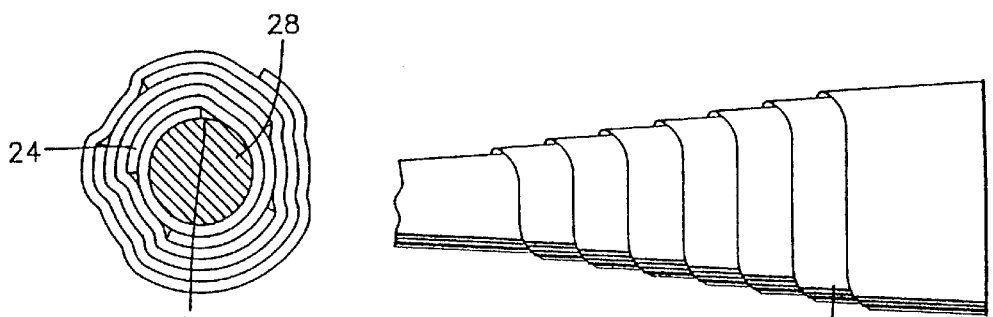
FIG. 9 is a cross-sectional view of the rolled up patterns of composite material on the mandrel in accordance with the present invention.
FIG. 15 is an elevational view schematically illustrating the spirally wrapped tape around the rolled up composite on the mandrel in accordance with the present invention.

In addition to the first pattern being secured so that it does not move relative to the mandrel, the first wrap of the first pattern 24 on the mandrel 28 must be tight against the mandrel to ensure minimum displacement and distortion throughout the remainder of the rolling and the subsequent consolidation process. Thus, the affixation of the leading edge of the first pattern to the mandrel is important for the rollup process to produce the desired quality characteristics. The affixation of the subsequent patterns to the preceding pattern during the rollup assures the tightly wound patterns of composite material on the mandrel as exaggeratedly illustrated in FIG. 9.

Figure 10:
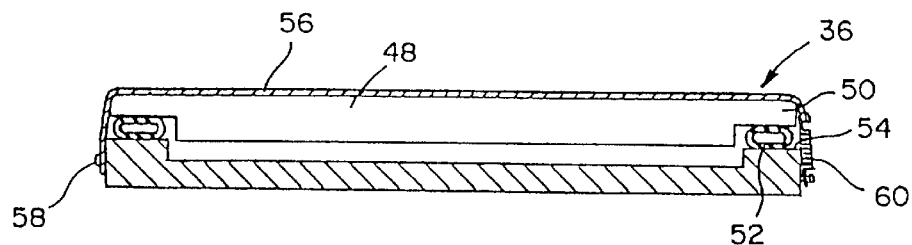
FIG. 10 is a transverse sectional view schematically illustrating a typical lower platen construction which enables the lower platen to conform to the lower external surface of the mandrel and composite patterns during rollup.
Figure 11:
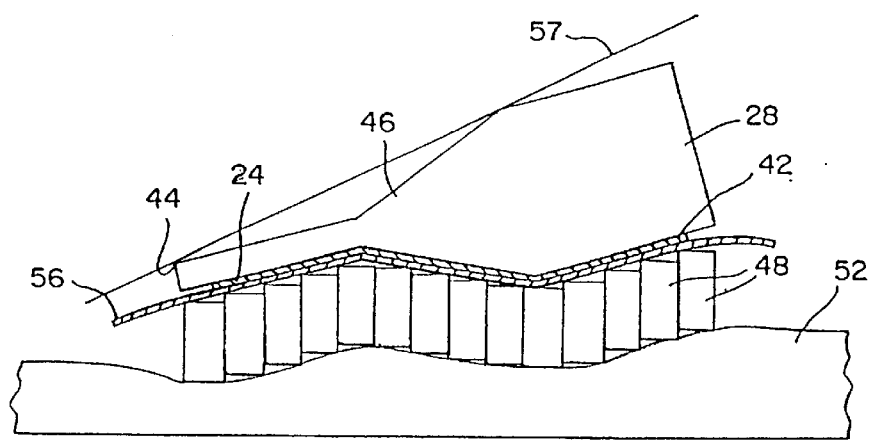
FIG. 11 is an enlarged cross-sectional view schematically illustrating the variation in the position of the keys of a typical lower platen to conform the lower platen with the bottom surface of the mandrel and composite patterns during rollup.

FIGS. 10 and 11 illustrate typical structure of the lower platen 36 for wrapping composite prepregs on mandrels having different sloped surfaces. As illustrated in FIG. 3 and exaggerated in FIG. 11, a typical mandrel 28 is not cylindrical or uniformly tapered. Rather, mandrel 28 usually includes a cylindrical end portion 42 of a larger diameter at the butt end and a cylindrical end portion 44 of a smaller diameter at the tip end with a tapered portion 46 connecting the cylindrical end portions 42 and 44. Since it is essential that the composite material conform with the surface of the mandrel, the lower platen 36 includes a plurality of side-by-side transversely extending bars or keys 48 which are disposed in surface-to-surface contacting relation and are capable of relative vertical movement in relation to each other to conform the upper surface defined by the keys 48 generally to the contour of the mandrel 28, as illustrated in FIG. 11. However, the upper platen has a uniformly flat surface, illustrated by the straight line 57 in FIG. 11, which does not conform to the irregular surface of the mandrel.

As illustrated in FIG. 10, each of the keys 48 includes an extension 50 on each end thereof which overlies and engages an air pressure flexible hose 52. The hose 52 has an upper surface engaging the bottom edge of the extension 50 on the keys 48 and a bottom surface which engages a longitudinal supporting surface 54 on the lower platen. Thus, the keys 48 can move vertically in relation to each other so that the upper surface thereof conforms with the contour of the surface of the mandrel. To retain the keys in place and enable movement of the keys, a flexible cover 56, preferably made of fabric, such as canvas, overlies and contacts the upper edges of the keys 48. One edge of the cover 56 is anchored to the supporting structure 54, as at 58. The edge opposite to edge 58 is provided with a plurality of springs 60 connected to the edge and the support 54 to keep the cover 56 taut and yet enable the keys to move vertically to conform to the contour of the mandrel 28.

Figure 12:
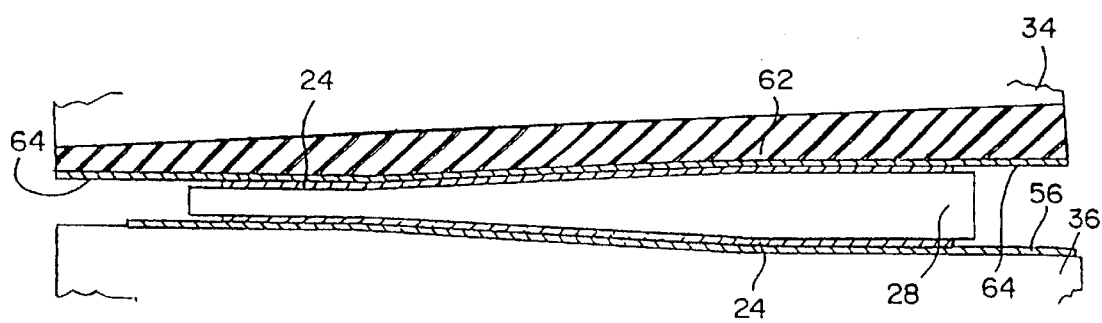
FIG. 12 is a front view partially in cross-section schematically illustrating the top platen of the present invention in contact with the mandrel and first pattern.
Figure 13:
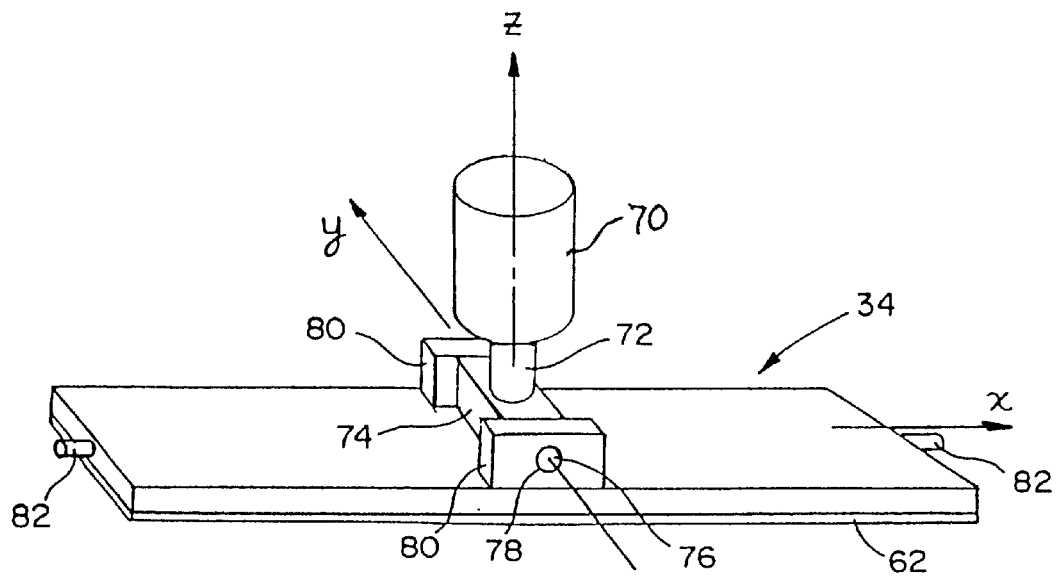
FIG. 13 is a perspective view schematically illustrating the structure of a top platen in accordance with the present invention and its connection to the pneumatic cylinder for up and down movement and side to side tilting.

FIG. 12 illustrates schematically the mandrel 28, the first pattern 24 attached thereto which does not extend the full length of the mandrel 28, and the upper platen 34 in accordance with the present invention. The upper platen, being flat, normally engages the mandrel only at its high points, as illustrated by the straight line 57 in FIG. 11. However, in accordance with the present invention, the underneath or pressure applying side of the upper platen 34 is provided with a resilient pad 62 as illustrated in FIGS. 12 and 13. The pad 62 deforms under pressure thus causing the pressure exerted by the upper platen 34 against the mandrel to be applied more uniformly and conform fully with the contour of the mandrel 28. This conforming pressure makes more uniform full length contact between the thermoplastic pattern along the full length of the material and the mandrel. More uniform full length contact ensures that all of the revolutions of the thermoplastic prepreg patterns will conform with the surface of the mandrel and ensures that the fibers are placed and remain in the desired location and orientation on the mandrel for the subsequent consolidation process.

Further, the pad 62 is cooled by the upper platen in order to remove heat from the thermoplastic resin. As such, the thermoplastic resin hardens sufficiently before it leaves contact with the pad 62 so that the rolled pattern retains its desired tight rolled shape on the mandrel. Preferably, pad 62 is a flat thin sheet made of silicone rubber or the like having a thickness on the order of about ⅛ inch to about ¼ inch, (about 0.3 cm to about 0.6 cm), depending upon the mandrel shape. It covers at least that portion of the underside surface which contacts the mandrel and the rolled up patterns. Preferably, pad 62 is adhered to the underside of upper platen 34 by vacuum suction so that the pad 62 can be easily replaced, as necessary in the manufacturing process, but can be adhered to the platen by any other suitable mechanism, such as by gluing, Velcro or double sided adhesive tape.

Because the mandrel is tapered, the rolling movement of the mandrel resulting from the relative movement of the platens causes the mandrel to move in an arcuate path during its rotational movement between the platens. Thus, the platens are both supported for rotation about a vertical axis. As shown in FIG. 13, the upper platen 34 can move downwardly and upwardly with downward pressure being exerted by a vertically disposed pneumatic cylinder 70 with the piston 72 in the cylinder enabling free rotation of the upper platen about a vertical axis through the cylinder 70. The outer end of cylinder 70 is connected to elongated rod 74 having pivot pins 76 mounted axially thereon. Pivot pins 76 are received in circular holes 78 through upstanding tabs or ears 80 mounted on the top of platen 34. As so mounted, platen 34 is also able to tilt side to side on pivot pins 76 received in holes 78.

Upper platen 34 is preferably made of aluminum and has a hollow interior between two spaced plates welded together with narrow strips around their peripheral edges forming a cavity therebetween. Thus, the upper platen can be conveniently cooled by circulating water through the hollow platen, such as through inlet and outlet nipples 82. The upper platen 34 may be provided with a fabric covering 64 over the resilient pad 62, as shown in FIG. 12, to assure traction between the mandrel and composite patterns rolled thereon.

Figure 14:
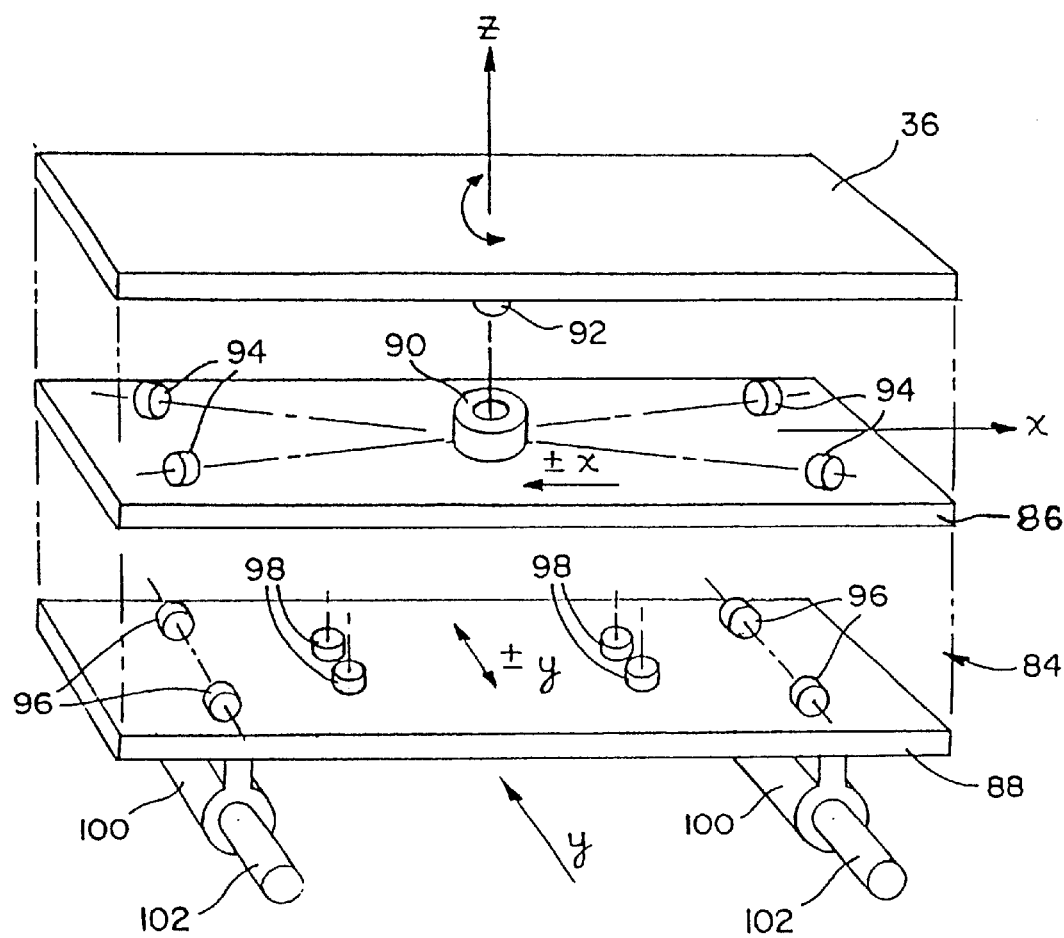
FIG. 14 is a perspective view schematically illustrating the support structure for a bottom platen in accordance with the present invention whereby the lower platen can be moved rearwardly underneath a heater behind the top platen.

The supporting structure for the lower platen 36 is illustrated schematically in FIG. 14 and is generally designated by the numeral 84. The structure 84 includes a subplaten 86 positioned laterally between the bottom platen 36 and a moving base 88. The subplaten 86 has a bearing 90 located centrally on its upper surface to receive a rod 92 mounted on the underside of the bottom platen 36. The upper surface of the subplaten 86 also includes a plurality of vertically disposed wheels 94 suitably located and oriented to support the bottom platen 36 for rotation on the subplaten. The wheels 94 and bearing 90 allow the bottom platen 36 to rotate in a horizontal plane.

Mounted on top of moving base 88 are a plurality of vertically disposed wheels 96, and at least two pair of horizontally disposed wheels 98 aligned longitudinally across the base 88. Each pair of wheels 98 receives therebetween a guide bar (not shown) mounted on the bottom of subplaten 86 which guides the subplaten for side to side free translation movement with respect to the base 88. Wheels 96 are positioned to support the subplaten and are aligned to allow free translational movement of the subplaten. The moving base 88 has linear bearings 100 mounted underneath on each side, which receive therein cylindrical rods 102 which are fixed to the base of the machine. The bearings 100 and rods 102 allow the base, along with the subplaten and bottom platen mounted thereon to move front to back.

Thus, the lower platen 36 is capable of moving away from the upper platen, and underneath the heater 38. The lower platen then can move underneath the upper platen for engagement with the heated mandrel and thermoplastic composite material. Continued movement of the moving base 88 with the bottom platen thereon causes the yet unwound pattern, such as pattern 24 or 26, as previously described, to be tightly wound upon the mandrel 28, with the free vertical rotational movement of the upper platen 34 and lower platen 36 accommodating any variation in the rolling of the mandrel and composites thereon.

The mandrel 28 with the prescribed thermoplastic plies applied and rolled thereon is then spirally wrapped with a tension tape 66 which will not melt at the about 450° F.–650° F. (about 230° C.–340° C.) temperature at which the typical thermoplastic matrix will melt. The tape is typically about ½ inch to about ¾ inch (about 1.3 cm to about 2 cm) wide and is spirally wound at a pitch of about ¹/₁₆ to about ³/₁₆ of an inch (about 0.15 to about 0.45 cm) along the shaft so that there are always multiple layers of the tensioned tape over the thermoplastic patterns on the mandrel. The tape is applied under very high tension which causes the tape to stretch as it is applied. Hence, when the thermoplastic composite is heated during consolidation, the tape exerts significant inward pressure on the composite plies wrapped around the mandrel. The tape is preferably made of Teflon®, Kapton® or other suitable high strength material.

The consolidation of the thermoplastic shaft on the mandrel is carried out in an oven which is time and temperature controlled to provide the right conditions for good consolidation with the particular thermoplastic matrix used. Consolidation is the process of heating the multiple layers of prepregs above the melting temperature of the thermoplastic resin under pressure and for sufficient time to ensure intimate contact between the layers and complete bonding of the layers as well as allowing the fibers and thermoplastic to move sufficiently relative to each other to minimize the final volume while at the same time not resulting in too much loss of the thermoplastic and to produce a substantially voidless monolithic structure and then cooling under pressure to less than the solidification temperature. When using nylon 6, consolidation in accordance with the present invention can suitably be done at temperatures of about 450–520° F. (about 230–270° C.) and for a time of about 20–45 minutes followed by cooling under pressure to less than about 370° F. (about 190° C.). Suitably, consolidation temperatures for polyphenylene sulfide are about 580° F. to about 620° F. (about 300° C. to about 330° C.).

After consolidation, the shafts are removed from the oven, and the mandrel is removed from inside the shaft. Hence, it is important that the thermoplastic composite not adhere permanently to the mandrel. In accordance with the present invention, a liquid release compound is preferably applied to the mandrel in a very thin layer, such as being wiped onto the mandrel as a film, to make certain that the first thermoplastic composite ply, such as pattern 24, and the adhesive tape 40, do not adhere permanently to the mandrel. Two suitable release agents are Monocoat E-304 and Zyvax 320. After the mandrel is removed, the shaft is final finished in conventional manner.

The method and apparatus of this invention effectively construct a thermoplastic composite golf club shaft from thermoplastic unidirectional prepregs in the form of patterns cut from sheet material. The patterns are typically trapezoidal or rhomboid in shape although they may be in other shapes including triangular. Most of the patterns are the full length of the golf club shaft, although some patterns may be only of partial length to enhance the strength and stiffness characteristics of certain local areas of the golf club shaft. The patterns cut from the larger sheets have unidirectional fibers with the individual pieces being cut and selected to obtain the desired angular relation of the fibers to the longitudinal axis of the final golf club shaft.

Reinforced thermoplastic golf club shafts made in accordance with the present invention have passed recognized durability tests required for golf club shafts to be accepted as high quality. The first test was performed with the so-called "Iron Byron" robot, which simulates a golfer's swing. The shaft under test is assembled into a club and the robot repeatedly swings the assembled club so that the club head strikes a golf ball on a tee at about 110 to 115 miles (about 175 to 185 km) per hour. The robot and club are positioned relative to the tee so that the strike point of the club head on the ball occurs at the heel of the head and high on the face. This is called the "high hosel" face location. This location causes maximum loading on the shaft. If a shaft does not break or crack in any way after 50–100 successive hits, the shaft passes the test. Shafts made in accordance with the present invention have passed the Iron Byron robot high hosel hitting test.

A second durability test is the so-called "air cannon" test. In this test, the ball is shot from a pneumatic cannon at the stationary club face of the assembled golf club at speeds between about 130 and 140 miles (about 210 and 225 km) per hour. The assembled golf club is held in a compliant, slightly dampened mount to approximate a person holding the golf club. Again, the location of the strike of the ball on the club head is controlled, with the high hosel location creating the most severe loading on the golf shaft. If the shaft does not break or crack after 100–200 hits, the shaft passes the test. Assembled clubs with golf shafts made in accordance with the present invention have passed the air cannon high hosel impact test.

In addition to passing the foregoing tests, golf club shafts in accordance with the present invention have been made with the desired weight, flex, frequency, and torsional stiffness to give high performance in the golfer's hand when assembled into a club. The shafts of this invention exhibit all of the desired characteristics of the best thermoset golf club shafts in terms of flex, frequency and torque, at weights equal to or less than the comparable thermoset shafts. More specifically, shafts made in accordance with the present invention, in weights of 60–75 grams, have exhibited frequencies of 240–280 cycles/min., torque of 4–6°, and flex of L,R,S,X.

Figure 18:
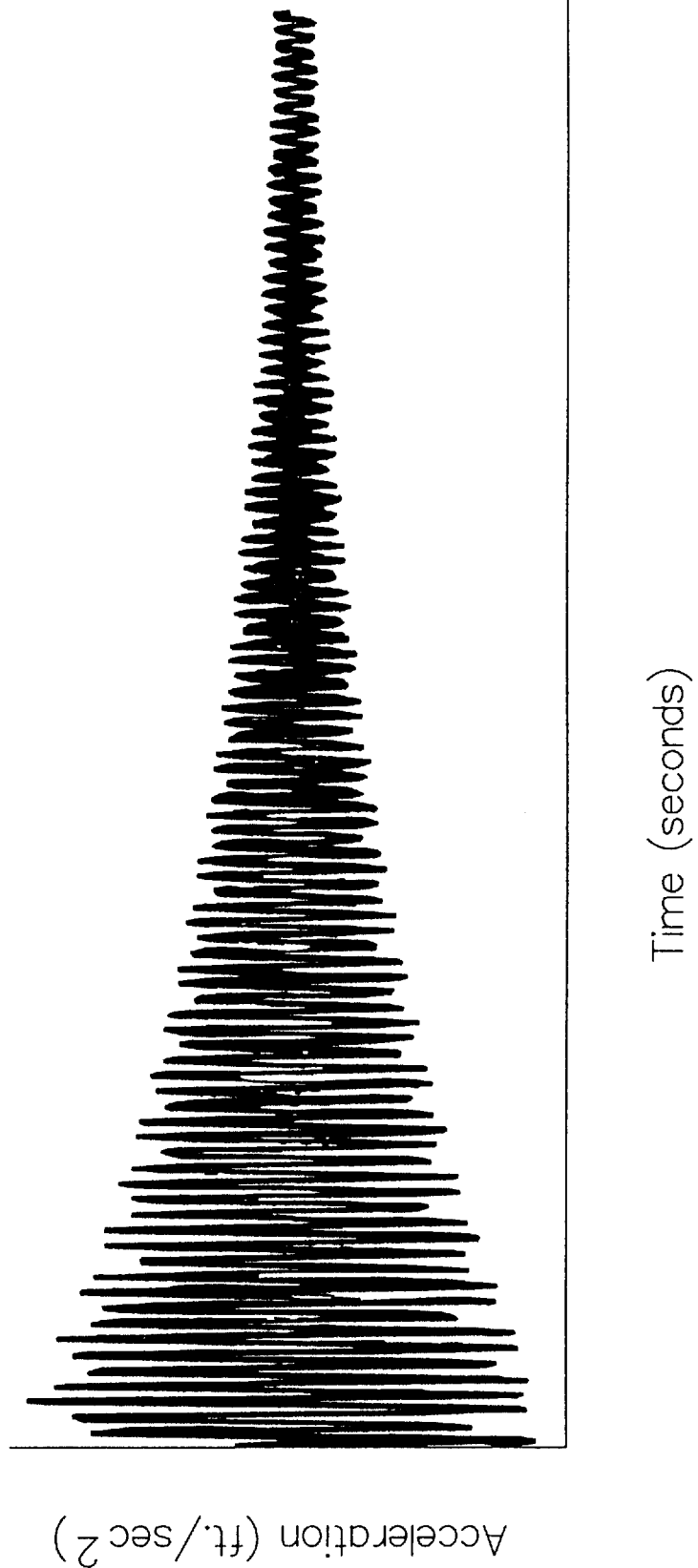
FIGS. 18 and 19 are comparative graphs showing the advantage in vibration dampening of voidless thermoplastic shafts according to the present invention as compared to conventional thermoset shafts.
Figure 19:
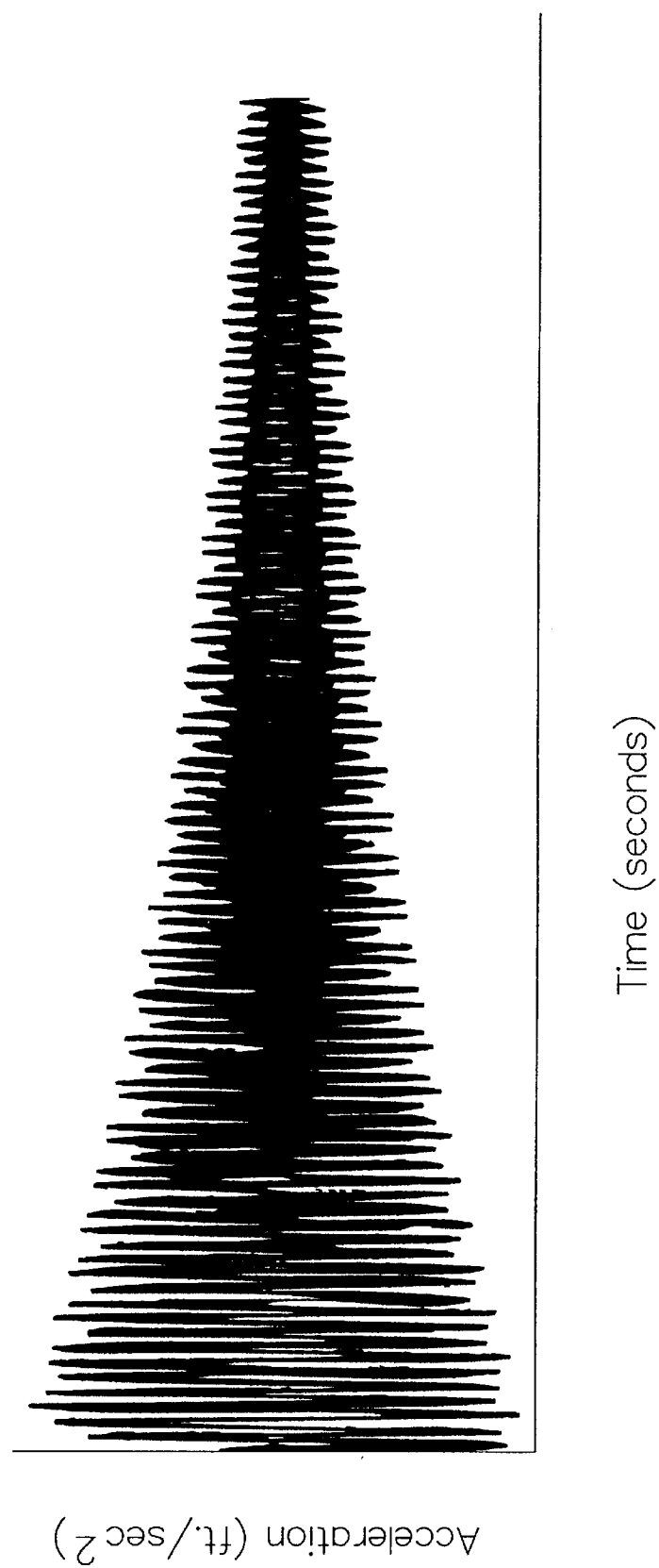

The thermoplastic shafts of the present invention have substantial advantage over comparable thermoset shafts in terms of vibration dampening. FIG. 18 shows the amount of vibration dampening with the lapse of time of golf club shafts made according to the present invention. As can be seen by comparison with FIG. 19, which shows a graph of vibration dampening of prior art shafts, the golf club shafts made according to the present invention exhibit substantially better vibration dampening.

In addition to the improvement in vibration dampening, there are a number of other advantages of using thermoplastic resins over thermosetting resins to make golf club shafts. Among these are the following:

1. No refrigeration is required for prepreg for thermoplastics but is required for thermosets;
2. No paper backing on the thermoplastic prepreg;
3. Shelf life is infinite for thermoplastic prepreg at room temperature whereas it is finite for thermosets;
4. Thermoplastic prepreg is not sticky;
5. Thermoplastics are solvent-free materials and are, therefore, environmentally friendly;
6. Scrap is "recyclable" (while it is not practical to separate the thermoplastic material from the carbon fibers, one can chop the carbon fiber/thermoplastic combination into a fine matrix and then use the resulting product in other applications, such as molding of golf club heads).

It will be understood that the claims are intended to cover all changes and modifications of the preferred embodiments of the invention herein chosen for the purpose of illustration which do not constitute a departure from the spirit and scope of the invention.

What is claimed is:

1. A method of making a tubular member from composite material having unidirectional high strength fibers impregnated in a thermoplastic resin matrix which comprises the steps of:

(1) taping a lengthwise edge of at least one pattern of said composite material to a mandrel of non-uniform taper,
   (2) placing the mandrel and pattern on a first platen,
   (3) heating the pattern to above the melt temperature of the thermoplastic resin using an external heat source,
   (4) moving a second platen which conforms to the shape of the mandrel into pressure engagement with the mandrel and pattern of composite material on the first platen,
   (5) rolling the pattern tightly onto the mandrel while simultaneously removing heat from said composite material to solidify the pattern in a tight wrap on said mandrel,
   (6) releasing the mandrel and said rolled pattern of composite material from the platens,
   (7) consolidating said composite material on said mandrel into a tubular member of said composite material, and
   (8) removing the tubular member from the mandrel.

2. The method as defined in claim 1 wherein additional patterns of said composite material are rolled onto said mandrel.

3. The method as defined in claim 2 wherein the unidirectional fibers are oriented at approximately 0° and 45° angles in the patterns of composite material.

4. The method as defined in claim 1 wherein said consolidating step includes the step of spirally wrapping a tension tape onto the composite material on the mandrel and then heating the mandrel and composite material to a temperature above the melt temperature of said thermoplastic resin.

5. The method as defined in claim 1 wherein a second pattern of said composite material is affixed on said first pattern.

6. The method as defined in claim 1 wherein the tubular member is a golf club shaft which has a butt end and a tip end and wherein the diameter of the golf club shaft at the butt end is greater than the diameter of the golf club shaft at the tip end.

7. The method as defined in claim 6 wherein said golf club shaft is tapered from said butt end to said tip end.

* * * * *